Aug. 21, 1956   L. ROSEMAN ET AL   2,759,194
FASTENER FOR GARMENTS AND THE LIKE
Filed Oct. 17, 1951   2 Sheets-Sheet 1
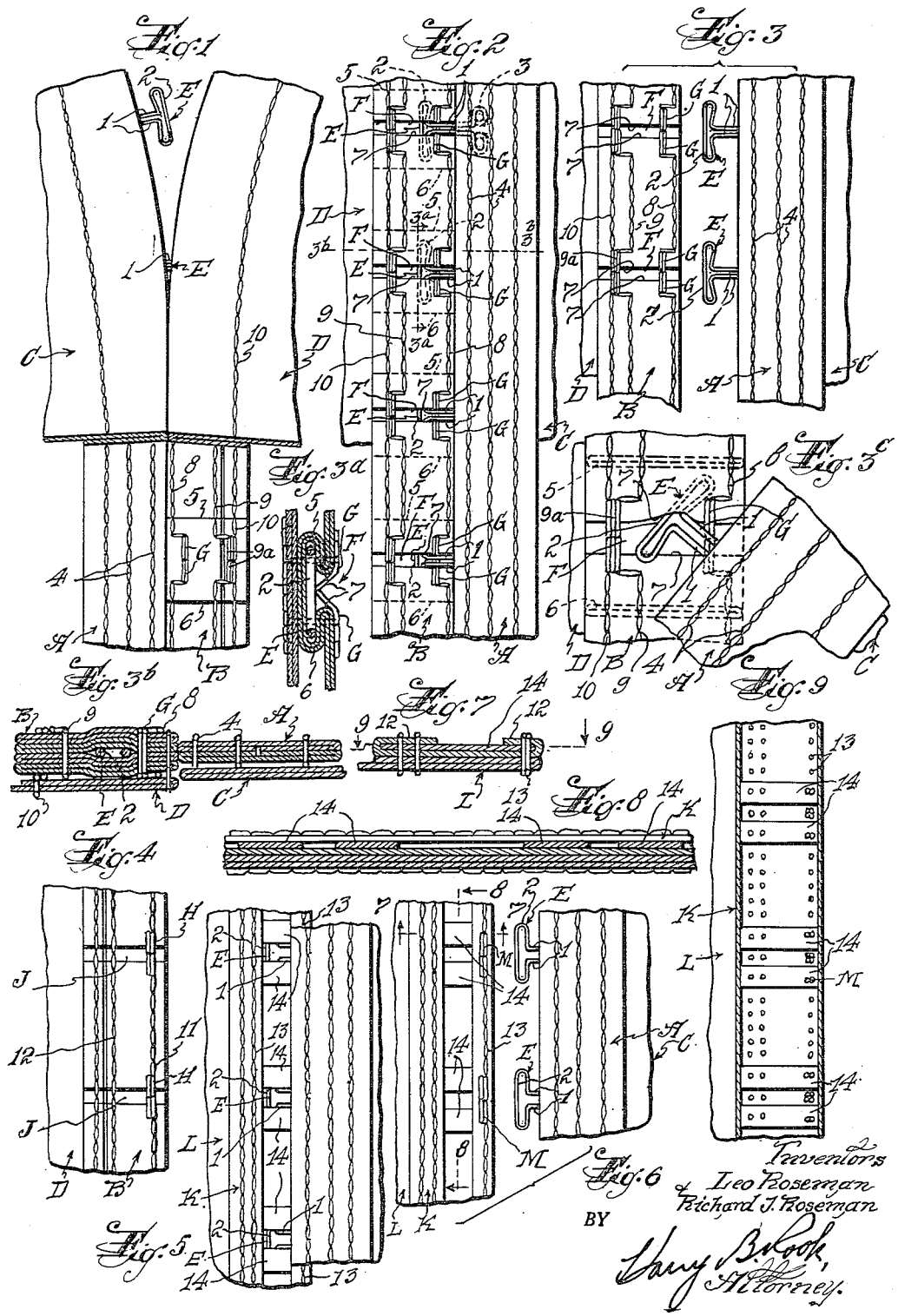

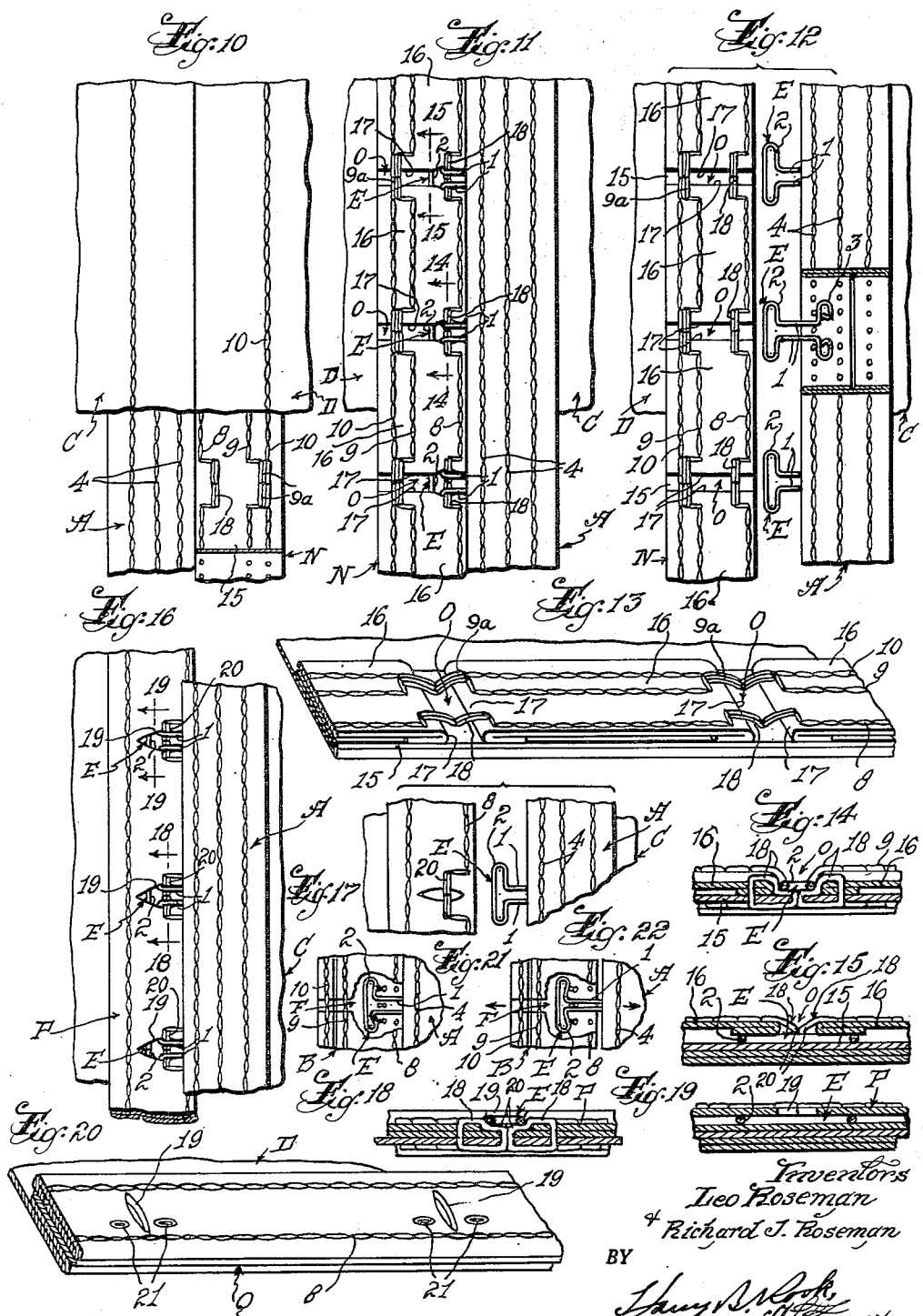

United States Patent Office 2,759,194
Patented Aug. 21, 1956

2,759,194

FASTENER FOR GARMENTS AND THE LIKE

Leo Roseman, Newark, and Richard J. Roseman, Union Township, Hunterdon County, N. J.

Application October 17, 1951, Serial No. 251,684

1 Claim. (Cl. 2—265)

This invention relates especially to fasteners for garments such as corsets, brassieres, shirts, and the like but the invention may be embodied in fasteners for other purposes.

The most commonly used garment fasteners are of four types, namely, the hook and eye fastener, the head and socket fastener, the slide operated or zipper fastener and the button and button hole fastener.

Fasteners of the hook and eye type, the head and socket type and the button hole type have several disadvantages among which are protuburances caused by the fastener elements, and bulkiness due to overlapping of the fastener sections or garment edges, both of which are uncomfortable to the wearer. Furthermore, it is frequently difficult to connect and disconnect the complemental fastener elements, and the operation is slow and tedious. Puckering of the garment is often caused by the zipper fastener, the fastener is frequently stiff and is often difficult, if not impossible to operate, especially in tight fitting garments; and the slider of the fastener causes a protuberance which is visible beneath thin outer garments.

Therefore, a prime object of the present invention is to provide a fastener embodying novel and improved features of construction which shall overcome the above mentioned difficulties and disadvantages, shall permit a thin, flat, edge to edge fastening of the edges of a garment opening or the like, and shall have complemental fastener elements that shall be easily and quickly connectable and disconnectable and shall be locked against accidental disconnection.

Another object is to provide a fastener which can be produced rapidly and inexpensively, which can be easily and quickly applied to a garment or the like, and which shall be light in weight, flexible and soft.

Still another object is to provide a fastener wherein the strength of the hereinbefore mentioned known fasteners shall be attained with the use of substantially less metal, for example, one third of the metal utilized in the known fasteners. This is especially important in these days of critical shortages of metal.

A further object is to provide a fastener of this character which shall include a novel and improved combination of an elongated section, for example, a tape, having flexible fabric pockets or sockets spaced longitudinally thereof and opening through the face of the section, and a second section having relatively rigid head or hook fastener elements projecting from an edge of the section and separably cooperative with said sockets or pockets, whereby the fastener shall be flexible and easy to operate and shall permit disconnection of all complemental fastener element, that is, the pockets and head members, quickly at one time and in one simple relative movement or pulling apart of the edge portions of the garment from one end toward the other similar to the movement incident to tearing paper, and the multiple head elements and pockets shall prevent accidental rotation or swinging of the head elements relative to the pockets such as would allow accidental disconnection of the head elements from the pockets.

Other objects, advantages and results of the invention will be brought out by the following description in conjunction with the accompanying drawings, in which Figure 1 is a fragmentary top plan view of a fastener embodying the invention secured to the edge portions of a garment;

Figure 2 is a bottom plan view of the fastener illustrated in Figure 1;

Figure 3 is a view similar to Figure 2 showing the two sections of the fastener in separated relation;

Figures 3a and 3b are enlarged sectional views on the planes of the respective lines 3a—3a and 3b—3b of Figure 2;

Figure 3c is a fragmentary top plan view of the fastener sections showing the manner of inserting a head element into a pocket;

Figure 4 is a bottom plan view of the pocket section of the fastener showing a modification of the invention;

Figure 5 is a view similar to Figure 2, illustrating another form of the invention;

Figure 6 is a view like Figure 3 showing the form of the invention illustrated in Figure 5;

Figure 7 is an enlarged transverse sectional view on the plane of the line 7—7 of Figure 6;

Figure 8 is a longitudinal vertical sectional view on the plane of the line 8—8 of Figure 6;

Figure 9 is a horizontal view, approximately on the plane of the line 9—9 of Figure 7;

Figure 10 is a view like Figure 1 showing another form of the invention;

Figure 11 is similar to Figure 2 but illustrating the form of the invention shown in Figure 10;

Figure 12 is similar to Figure 3 but showing the fastener of Figure 11;

Figure 13 is an enlarged fragmentary sectional perspective view of the pocket section or tape shown in Figures 10 to 12 inclusive;

Figures 14 and 15 are vertical sectional views on the planes of the lines 14—14 and 15—15, respectively of Figure 11;

Figure 16 is a bottom plan view of another form of fastener embodying the invention;

Figure 17 is a view similar to Figure 16 but illustrating the two sections of the fastener in separated relation;

Figures 18 and 19 are vertical sectional views, approximately on the planes of the lines 18—18 and 19—19, respectively of Figure 16;

Figure 20 is a sectional perspective view of another form of pocket tape;

Figure 21 is a fragmentary bottom plane view of the fastener shown in Figure 2 with portions of the tape broken away;

Figure 22 is a similar view showing the action of the head fastener element when the fastening sections are subject to forces tending to pull them apart edgewise or in their own planes.

The invention contemplates in general two sections, one having a plurality of pockets which may be formed in and spaced longitudinally of a fabric tape or may be formed directly in the marginal portions of a garment, while the other section has a plurality of head fastener elements spaced longitudinally of a fabric tape or the edge of a garment, each to cooperate with one of the pockets.

More particularly the fastener of the invention includes flat T-shaped fastener elements extending beyond the edge of the corresponding fastener section, to cooperate with the corresponding pocket sections which open through one face of the corresponding tape or the face of the garment and have abutments in spaced relation to the edge of the tape or garment for the arms of the T-shaped head elements and also have overhanging or inwardly projecting edge portions or flanges so that the ends of the heads of the head elements may be inserted into the pockets beneath said edge portions and in abutting relation to said abutments. The head elements are held against accidental displacement from their pockets by the overhanging edge portions or flanges, and the two sections of the fastener or the garment edges are held against being pulled apart by engagement of the head elements with said abutments.

The pockets may be of different construction as may also the head elements, and in Figures 1 to 3c inclusive, is illustrated one preferred embodiment of the invention. The reference characters A and B designate respectively the head element section and the pocket section, these sections being in the form of fabric tapes or strips that are applied as by stitching to the marginal portions C and D of a garment.

The tape comprising the head element section A is shown as comprising a plurality of layers or plies of fabric, for example, cotton textile fabric, on which and spaced longitudinally thereof are secured T-shaped head elements E which project from one edge of the tape as best shown in Figure 3. Preferably each head element is formed of a single piece of wire bent to provide a stem or shank portion comprising two spaced and parallel lengths 1 of the wire at one end of which is the head 2 in the form of a loop. The other end of the shank has a base portion comprising loops 3 which is arranged between opposed plies of the tape and secured to the tape in any suitable means as by lines of stitches 4. Each head element is in general flat and lies approximately in the plane of the tape with the head in spaced relation to the edge of the tape. The tape A is secured on and extends longitudinally of one of the marginal portions C and D of the garment with one edge approximately coincident with the garment edge, the tape being fastened on the garment in any suitable manner as by lines of stitches.

The tape comprising the section B also includes a plurality of layers of fabric and has a plurality of pockets F spaced longitudinally thereof corresponding to the spacing of the head elements E and opening through one face of the tape. The two tapes A and B may be applied to either face of the garment but preferably are applied to the inner face so that the pockets and head elements will be concealed when the fastener sections are connected together and the garment is applied to the body. The pockets F are shown in Figures 1 to 3 inclusive as formed by folding or doubling of the tape upon itself at longitudinally spaced points to form box pleats. More particularly and as shown in Figure 3a, for forming each pocket the tape is folded in one direction transversely upon itself as indicated at 5 and is then folded in the opposite direction as indicated at 6 so as to provide two folds 7 in spaced relation to each other transversely of the strip that provide edge portions or flanges for the pocket overlying the bottom wall of the pocket and forming between them an opening or mouth for the pocket. The width of the mouth between the flanges 7 is substantially less while the width of the pocket at its bottom is greater than the overall length of the head of one of the head elements so that said head can be slipped beneath said edge portions as shown in Figures 2 and 3a. The direction of the length of the mouth of the pocket is approximately perpendicular to one longitudinal edge of the tape or strip.

Each of the pockets has abutments G for the head of a head element in spaced relation to the edge of the tape B that is coincident with the edge of the corresponding garment section C or D. These abutments may be of various forms, for example, superposed stitches as shown in the drawings, or staples or metal eyelets but in all cases, preferably they secure all of the plies of the tape together at the edge portions of the corresponding pocket as best shown in Figure 3b. Also the plies of fabric of the tape are secured together by longitudinal lines of stitches 8 and 9 that may be formed in a continuous operation with the superposed stitches G. The line of stitches 9 is spaced lengthwise of the pockets F from the superposed abutment stitches G and the line of stitches 8, and includes stitches 9a that may or may not be superposed but which firmly secure the edge portions 7 of the pockets to the other plies of the tape in the same manner as do the stitches G. The distance between the stitches G and 9a is just sufficient to permit the head of the head element to be inserted into the pocket beneath the edge or flange portions 7 when the head is turned diagonally to the longitudinal edges of the tape as shown in Figure 3c, and the stitches 9a and G thus cooperate to hold the head element against accidental displacement from the pocket during the alternate application and release of tension on the fastener which tends to cause the head element to move lengthwise of the pocket when the garment is being worn. The width of the opening or mouth of the pocket between the edge portions 7 is somewhat greater than the stem 1 of the head element so that the latter may enter between the edge portions 7 when the head element is inserted into the pocket and said edge portions restrain the head element against lateral movement. The tape B may be secured to the garment as by lines of stitches 10.

The operation of the fastener will be apparent from the foregoing. When the fastener sections are separated as shown in Figure 3 and it is desired to connect them or close the fastener, the heads 2 of the head elements are inserted into the respective pockets in succession, each head being twisted diagonally to the edge portions of the pocket tape and to the longitudinal edges of the pocket mouth and the head element then being tilted slightly obliquely to the plane of the pocket tape alternately in opposite directions to facilitate the slipping of the ends of the head beneath the respective edge portions 7 of the pocket as illustrated in Figures 3c and 2. It will be observed that the whole head element including head, shank, and base lies in a flat plane and is turned while it is approximately in the plane of the tape, as distinguished from the operation of buttons and button holes and head and socket snap fasteners. Then the tension on the fastener sections tending to pull them apart, will draw the heads of the head elements into abutting relation to the abutment elements G as shown in Figures 2 and 3b. It will be noted that the abutment elements engage the head elements at points intermediate the stem or shank 1 and the extremities of the head so that the head elements may rock or twist to compensate for relative movements of the fastener sections that might be incident to movements of the body on which the garment is worn. To separate the head elements from the pockets, the head elements are again turned with their heads oblique to the edges of the tape after which the head is turned alternately in opposite directions obliquely to the plane of the tape to permit withdrawal successively of the portions of the head from the pocket. Rapid disconnection of the head elements from the pocket in one continuous operation can be effected by simply pulling apart the edge portions of the garment from one end toward the other, similar to the movement incident to tearing paper.

It is desirable to have the abutments spaced inwardly from the edge of the tape and from the line of stitches 8 both to provide the rocking action above mentioned and also to prevent breaking of the stitches 8 by the end portions of the heads of the head elements; although the stitches may be arranged as shown in Figure 4 where the abutment stitches H are in line with the row of stitches 11 that fasten the plies of the tape together. As shown in Figure 4 the other line of stitches 12 for fastening the edge portions of the pockets J may be formed without superposed stitches corresponding to the stitches 9a.

Another modification of the invention is shown in Figures 5 to 9 inclusive where the pocket tape K is formed of a strip of fabric having its edge portions folded inwardly and secured to the main portion by stitches 13 which may also be used for fastening the tape to the garment edge portion L. Each pocket is formed of a pair of parallel strips secured to the tape in spaced relation to each other corresponding to the edge or flange portions 7 of the pockets hereinbefore described so that the head elements E may be inserted between and beneath the strips 14 for connecting the pocket tape K to the head element tape A. Abutment stitches M corresponding to the stitches G and H may be formed in the same operation with the stitches 13.

Another modification of the invention is shown in Figures 10 to 15 inclusive where the head element tape is identical to the tape A above described but the pocket tape N comprises a body strip 15 of fabric on which are secured auxiliary strips 16 having their edge portions infolded between the main portions of the strips 15 and 16 as indicated at 17 to form edges of pockets 0 that have suitable abutments such as the stitches 18 corresponding to the abutments G. The head elements are inserted beneath the folded edge portions 17 just as they are beneath the edge portions 7 of the pockets F; and the operation of the fastener is the same as that shown in Figures 1 to 3c inclusive.

Still another form of the invention is shown in Figures 16 to 19 where the head element tape A is the same as that hereinbefore described but the pocket tape P comprises one or more plies of fabric in at least one of which is elongated opening 19 that opens through the face of the tape and is spaced inwardly from the edge of the tape as best shown in Figure 17. Adjacent the edges of the opening 19 which correspond to the edge or flange portions 7 and intermediate the length of the opening are abutments 20 that may constitute superposed stitches transversing the edges of the opening and penetrating the plies of the tape. In operation of this form of invention to connect the fastener sections, one end of a head element will be inserted into a corresponding pocket opening 19 and then the head element will be turned obliquely to the edge of the tape whereupon the other end of the head element will be inserted into a pocket. Obviously the width of the pocket opening 19 will be less than the head of the head element and the length of the pocket opening between the abutments 20 and the inner end of the opening will be adequate to permit the insertion of the head of the head element into the opening.

Figure 20 shows a further modification of the invention wherein the pocket tape Q is in general the same as that shown in Figures 16 to 19, but instead of abutment stitches 20, the abutments are in the form of metal eyelets 21 which penetrate the plies of the tape.

The formation of the head element of wire is advantageous because of the lightness and flexibility of the wire and the small amount of metal involved therein, and the head 2 and the two spaced parallel portions of the shank resiliently yield upon application of tension in opposite direction to the two fastener sections as shown in Figures 21 and 22 and at the same time the two portions of the shank are held in spaced side-by-side relation and prevented from becoming superposed and entangled.

In all forms of the invention it will be noted that the edge portions or flanges of the pockets extend inwardly from opposite edges of the pocket openings and form mouths for the pockets through which the heads of the head elements are inserted; and that the length and width of the mouths of the pockets are such that the head elements can be inserted into and removed from the pockets only when the heads are obliquely disposed to the longitudinal edge of the tape.

While several of the now preferred embodiments have been shown and described it should be understood that this is primarily for the purpose of illustrating the principle of the invention and that the construction of the fastener may be widely modified and changed within the scope of the invention.

What we claim is:

A fastener comprising a head element section and a pocket section, each section including a strip of flexible material, said head element section having a plurality of substantially flat head elements spaced longitudinally thereof and secured thereon and each formed with a shank and a head in T-shaped relation, the head of each head element being in spaced relation to one edge of the corresponding strip and in a plane approximately parallel to the plane of the strip and to the plane of said shank; the pocket section having a plurality of pockets opening through one face of the pocket section strip and spaced longitudinal thereof correspondingly to the spacing of said head elements, each pocket being provided with an elongate mouth disposed centrally of the width of the pocket, the direction of whose length is approximately perpendicular to one edge of the corresponding flexible strip and whose width is substantially less than the width of the pocket and of the length of the said head of the head element, whereby the head element section can be connected to the pocket section by inserting the head of each head element endwise through the mouth of the corresponding pocket diagonally thereof and into said pocket and then turning the head in its own plane into a position approximately perpendicular to the direction of the length of said mouth.

References Cited in the file of this patent

UNITED STATES PATENTS

| | | |
|---|---|---|
| 567,348 | Luft | Sept. 8, 1896 |
| 622,349 | Halstenbach | Apr. 4, 1899 |
| 886,924 | Bernstein | May 5, 1908 |
| 1,428,358 | Burbery | Sept. 5, 1922 |
| 1,525,694 | Sage et al. | Feb. 10, 1925 |
| 1,799,716 | White | Apr. 7, 1931 |
| 1,831,496 | Jasina | Nov. 10, 1931 |
| 1,831,616 | Zimmerer et al. | Nov. 10, 1931 |
| 1,854,125 | Faber | Apr. 12, 1932 |
| 2,703,889 | Roseman | Mar. 15, 1955 |

FOREIGN PATENTS

| | | |
|---|---|---|
| 115,928 | Great Britain | May 30, 1918 |